Patented Aug. 6, 1929.

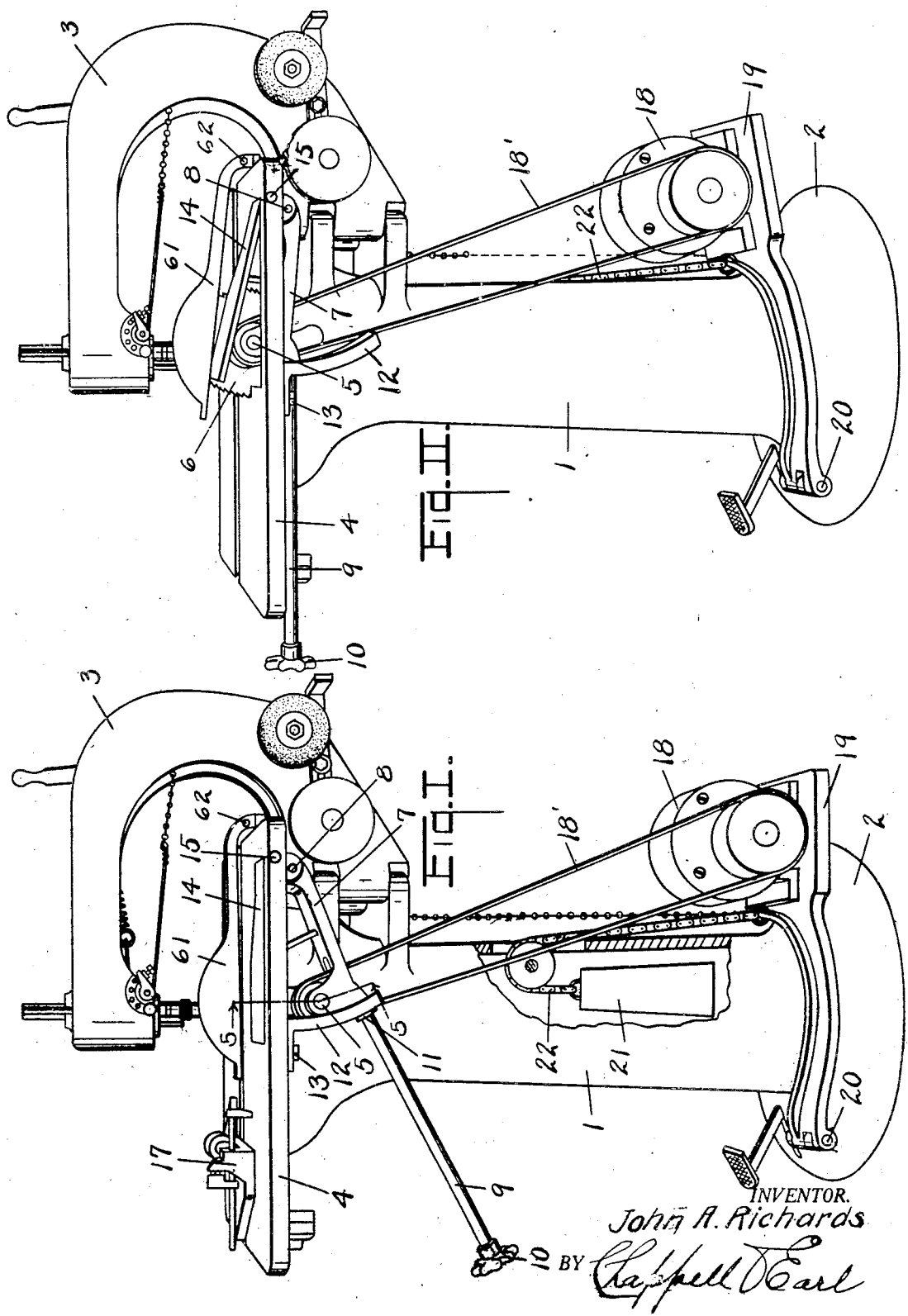

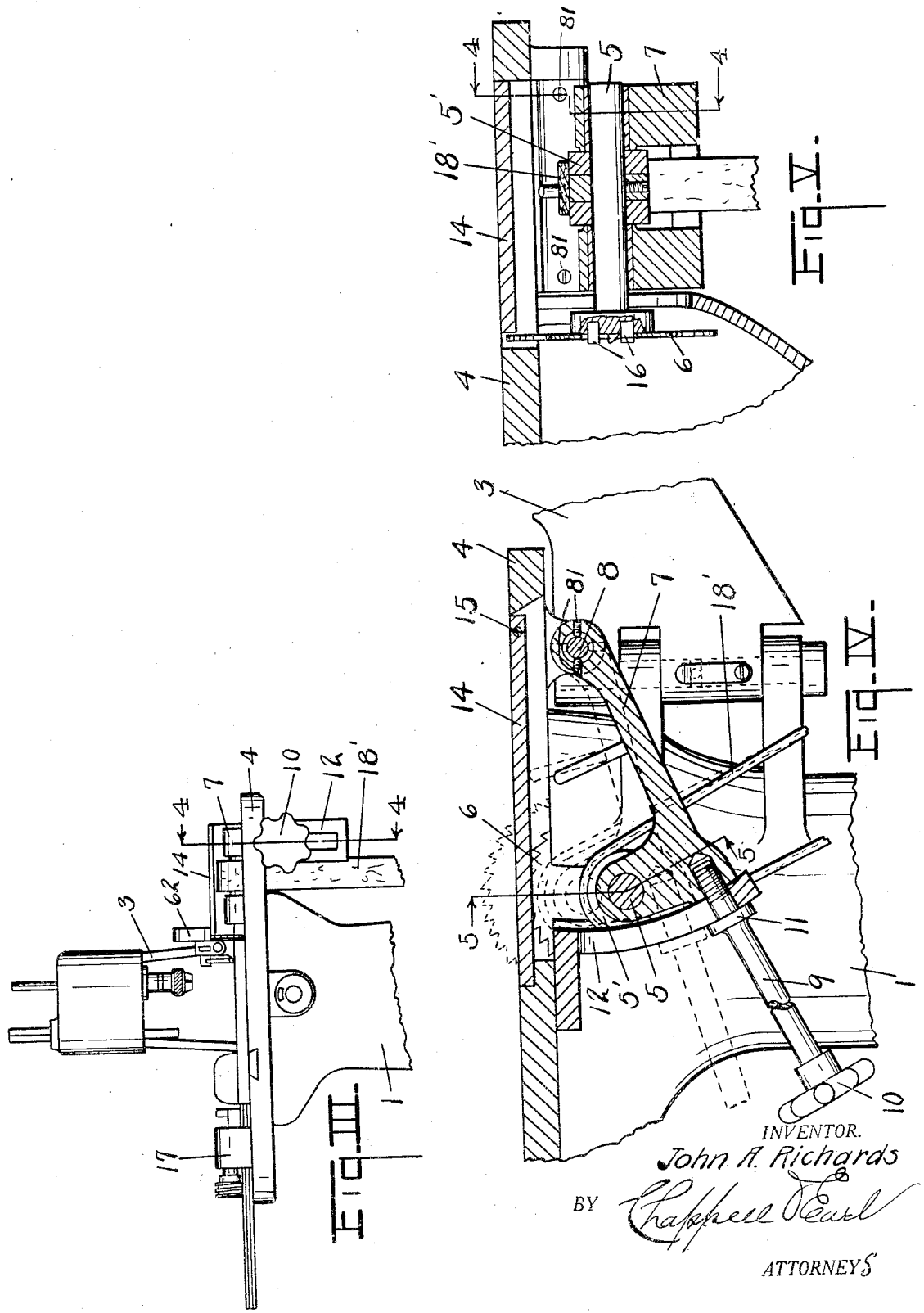

1,723,077

UNITED STATES PATENT OFFICE.

JOHN A. RICHARDS, OF KALAMAZOO, MICHIGAN.

CIRCULAR-SAW STRUCTURE.

Application filed February 23, 1922. Serial No. 538,732.

This invention relates to improvements in circular saw structures. It relates particularly to a saw adapted to electrotypers' use for cutting and trimming blocks or slugs with accuracy, although of general adaptability besides.

The objects of the invention are:

First, to provide improved means for manipulating the saw.

Second, to provide an improved saw adjusting means to facilitate its adjusting and locking.

Third, to provide such means in connection with counterbalance devices.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings forming a part of this application, in which:

Fig. I is a side perspective view of a machine embodying the features of my invention, the saw being in lowered position.

Fig. II is a similar perspective view in which the saw has been raised entirely through the table so that the trimming cutters on the face of the saw come into use.

Fig. III is a front elevation view of the upper portion of the structure as adjusted in Fig. II.

Fig. IV is an enlarged detail sectional view on the irregular line 4—4 of Figs. III and V showing the adjusting lever broken and indicating partial elevation of the saw by the dotted lines.

Fig. V is a detail sectional elevation on the irregular line 5—5 of Fig. IV.

In the drawings the sectional views are taken looking in the direction of the little arrows at the ends of the section lines and similar numerals of reference refer to similar parts throughout the several views.

I will consider the numbered parts of the drawing by their numerals. 1 is the supporting pedestal provided with a broad base 2 carrying a hinged saw or tool supporting arm 3 which carries a variety of tools and driving means such as drills, jig-saws and grinders ordinarily used in a machine of this kind. The same is merely shown here as an incident, the invention not relating thereto.

4 is the work table supported on the column 1 and disposed beneath the same is the saw arbor 5 provided with a pulley 5' and carrying the buzz-saw 6. The saw arbor is supported in the swing member or arm 7 which is pivoted at 8 to the under side of the table. This is adjusted by the lever 9 which is a hand screw provided with a hand wheel or handle 10 at its front end for manipulating the same and provided with a flange or collar 11 for engaging the slotted segment 12 (see Fig. IV) which is secured by a cap screw 13 to the under side of the table. By grasping the hand wheel or handle 10 the saw can be lifted up to different heights through the table or it can be lowered beneath the table.

The member or arm 7 is adjustable upon the pivot 8 by means of two pairs of diametrically opposed set screws 81 at each end—see Figs. IV and V. There is considerable clearance around the pin 8 so that by the adjustment of the set screws 81 the angle of the pivot to the arm can be varied in any direction. This is of consequence in properly locating and adjusting the saw into exact alignment with the table and to precisely the right angled relation of the arbor of the saw to the work.

An opening in the table is covered by hinged lid 14 pivoted at 15 and is disposed above the swinging arm or member 7 so that the entire saw arbor and its support can be raised above the table into the position indicated in Fig. II. The face of the saw 6 is provided with trimming cutters 16 of well known design so that after sawing a block or part, by further raising the saw, the same may be accurately trimmed and faced on the same line. Suitable work holders 17 are provided for handling the work and feeding it effectively. These may be of any convenient or well-known design, my invention here not pertaining to the work feeding means.

A saw guard 61 is provided, the same being preferably pivoted at 62 and being capable of being swung out of position and removed when the circular saw is not in use.

The saw is driven by an electric motor 18 provided with a belt 18' disposed to drive the driven pulley 5' on the saw arbor 5. The motor 18 is on a pivoted platform 19 supported on the pivot 20 towards the front of the machine. This motor is counterbalanced by the weight 21 in the base connected by suitable chain 22 thereto.

I have shown my improved machine in its preferred form but it can be considerably varied without departing from my invention. While it is a matter of great convenience to counterbalance the motor and manipulate it from the lever 9 as indicated, it would be possible to provide a connection to drive the saw without this particular arrangement in combination. I desire to claim the adjusting means as seen and also to claim the combination of which such adjusting means forms a part, as clearly indicated and pointed out in the appended claims.

Having thus described my invention, what I claim as new and desire to secure by Letters Patent is:

1. In a saw machine of the class described, the combination with a suitable base of a saw table with an opening therethrough, a saw carrying member pivoted to the under side of said table and adapted to swing on its pivot and be raised through the said opening therein, a buzz saw with facing cutters, saw arbor and pulley in bearings on said saw carrying member, a hinged lid for said table opening, adapted to be raised by said saw carrying member, a forwardly projecting hand clamp screw on said hinged saw carrying member, constituting the adjusting lever for manipulating and adjusting the said saw through the said table opening, an adjusting segment for engagement of the said clamp screw, an electric motor with drive pulley belted direct to the saw arbor pulley to drive said saw, a pivoted support for the said electric motor whereby the motor drops into tension on said belt, and a counterbalance for said motor within the base, all coacting for the purpose specified.

2. In a saw machine of the class described, the combination with a suitable base of a saw table with an opening therethrough, a saw carrying member pivoted to the under side of said table and adapted to swing on its pivot and be raised through the said opening therein, a buzz saw with facing cutters, saw arbor and pulley in bearings on said saw carrying member, a hinged lid for said table opening, adapted to be raised by said saw carrying member, a forwardly projecting hand clamp screw on said hinged saw carrying member, constituting the adjusting lever for manipulating and adjusting the said saw through the said table opening, an adjusting segment for engagement of the said clamp screw, an electric motor with drive pulley belted direct to the saw arbor pulley to drive said saw, a pivoted support for the said electric motor whereby the motor drops into tension on said belt, all coacting for the purpose specified.

3. In a saw machine of the class described, the combination with a suitable base of a saw table with an opening therethrough, a saw carrying member pivoted to the under side of said table and adapted to swing on its pivot and be raised through the said opening therein, a buzz saw with facing cutters, saw arbor and pulley in bearings on said saw carrying member, a forwardly projecting hand clamp screw on said hinged saw carrying member, constituting the adjusting lever for manipulating and adjusting the said saw through the said table opening, an adjusting segment for engagement of the said clamp screw, an electric motor with drive pulley belted direct to the saw arbor pulley to drive said saw, a pivoted support for the said electric motor whereby the motor drops into tension on said belt, all coacting for the purpose specified.

4. In a saw machine of the class described, the combination with a suitable base of a saw table with an opening therethrough, a saw carrying member pivoted to the under side of said table and adapted to swing on its pivot and be raised through the said opening therein, a buzz saw with facing cutters, saw arbor and pulley in bearings on said saw carrying member, a forwardly projecting hand clamp screw on said hinged saw carrying member, constituting the adjusting lever for manipulating and adjusting the said saw through the said table opening, an adjusting segment for engagement of the said clamp screw, and an electric motor, all coacting for the purpose specified.

In witness whereof, I have hereunto set my hand.

JOHN A. RICHARDS.